(12) United States Patent
Bourke et al.

(10) Patent No.: US 11,554,379 B2
(45) Date of Patent: Jan. 17, 2023

(54) FLOTATION LINE AND A METHOD (71) Applicant: OUTOTEC (FINLAND) OY, Espoo (FI)

(72) Inventors: Peter Gerard Bourke, Maida Vale Perth (AU); Antti Rinne, Espoo (FI); Rob Coleman, Queensland (AU)

(73) Assignee: OUTOTEC (FINLAND) OY, Espoo (FI)

( * ) Notice: Subject to any disclaimer, the term of this patent is extended or adjusted under 35 U.S.C. 154(b) by 756 days.

(21) Appl. No.: 16/321,736

(22) PCT Filed: Jul. 28, 2017

(86) PCT No.: PCT/FI2017/050559
§ 371 (c)(1),
(2) Date: Jan. 29, 2019

(87) PCT Pub. No.: WO2018/024945
PCT Pub. Date: Feb. 8, 2018

(65) Prior Publication Data
US 2019/0160476 A1    May 30, 2019

Related U.S. Application Data

(63) Continuation of application No. PCT/FI2016/050552, filed on Aug. 5, 2016.

(51) Int. Cl.
*B03D 1/02*    (2006.01)
*B03D 1/16*    (2006.01)
(Continued)

(52) U.S. Cl.
CPC ............ *B03D 1/02* (2013.01); *B03D 1/1406* (2013.01); *B03D 1/1443* (2013.01); *B03D 1/1456* (2013.01); *B03D 1/1462* (2013.01)

(58) Field of Classification Search
CPC ...... B03D 1/02; B03D 1/1456; B03D 1/1462; B03D 1/1443
(Continued)

(56) References Cited

U.S. PATENT DOCUMENTS

| 1,415,105 A | 5/1922 | Moffat |
| 2,494,602 A | 1/1950 | Wright |

(Continued)

FOREIGN PATENT DOCUMENTS

| AU | 653622 B2 | 10/1994 |
| CA | 1023881 A | 1/1978 |

(Continued)

OTHER PUBLICATIONS

Office Action issued by the African Regional Intellectual Property Organization (ARIPO) in relation to Application No. AP/P/2019/011327 dated Jul. 12, 2021 (4 page).

(Continued)

*Primary Examiner* — Peter Keyworth
(74) *Attorney, Agent, or Firm* — Robert P. Michal, Esq.; Carter, DeLuca & Farrell LLP (57) ABSTRACT

A flotation line for treating mineral ore particles suspended in slurry, including at least three flotation units arranged in fluid connection with each other for allowing gravity-driven slurry flow between flotation units, and a feed inlet for supplying slurry into a first flotation unit; wherein at least three flotation units are configured to be uniplanar, each flotation unit includes at least one flotation cell; and wherein the launder lip height of each uniplanar flotation unit is lower than the launder lip height of the preceding uniplanar flotation unit in the direction of the slurry flow, so that an angle of sloping between a first uniplanar flotation cell, equipped with a launder lip and being larger than 150 m³, and a last uniplanar flotation cell, equipped with a launder (Continued)

lip and being larger than 40 m³, is formed; and the angle is 1.5 to 10 degrees relative to horizontal.

36 Claims, 7 Drawing Sheets

(51) Int. Cl.
  *B03D 1/24* (2006.01)
  *B03D 1/14* (2006.01)
(58) Field of Classification Search
  USPC .......................................... 209/164, 169, 170
  See application file for complete search history.

(56) References Cited

U.S. PATENT DOCUMENTS

| | | | |
|---|---|---|---|
| 3,037,626 | A | 6/1962 | Takahashi |
| 5,205,926 | A | 4/1993 | Lawrence |
| 5,965,857 | A | 10/1999 | Hughes |
| 6,132,619 | A | 10/2000 | Lin et al. |
| 9,073,762 | B2 * | 7/2015 | Cummins ............ C02F 9/00 |
| 2008/0149536 | A1 | 6/2008 | Ronkainen et al. |

FOREIGN PATENT DOCUMENTS

| | | |
|---|---|---|
| CA | 2076473 A1 | 3/1993 |
| CL | 41181 | 5/2001 |
| CL | 16607 | 1/2005 |
| CN | 85109079 A | 3/1987 |
| CN | 201143456 Y | 11/2008 |
| CN | 201659030 U | 12/2010 |
| CN | 102755934 A | 10/2012 |
| CN | 203425922 U | 2/2014 |
| DE | 10329883 A1 | 1/2005 |
| EP | 1622724 A1 | 2/2006 |
| EP | 1622724 B1 | 6/2011 |
| GB | 349108 A | 5/1931 |
| GB | 1052116 A | 4/1968 |
| GB | 1287274 A | 8/1972 |
| GB | 1415105 | 11/1975 |
| RU | 2341333 C2 | 12/2008 |
| SU | 961787 A1 | 9/1982 |
| SU | 1159644 A1 | 6/1985 |
| SU | 1353508 A1 | 11/1987 |
| WO | 2004082842 A1 | 9/2004 |
| WO | 2007082317 A2 | 7/2007 |
| WO | 2018024945 A1 | 2/2018 |

OTHER PUBLICATIONS

International Search Report issued by the Finnish Patent and Registration Office acting as the International Searching Authority in relation to International Application No. PCT/FI2016/050552 dated Nov. 15, 2016 (6 pages).
Patent Search Report issued by the Federal Service for Intellectual Property (ROSPATENT) Federal Institute of Industrial Property (FIPS) in relation to Russian Application No. 2018113543/03 (2 pages).
Office Action issued by the Chilean Patent Office in relation to Chilean Application No. 201900250 dated Nov. 13, 2019 (10 pages).
Search Report issued by the Chilean Patent Office in relation to Chilean Application No. 201900250 dated Nov. 13, 2019 (3 pages).
Chilean Office Action issued by the Chilean Patent Office in relation to Chilean Application No. 201900250 dated May 15, 2020 (3 pages).
Chinese Office Action issued by the Chinese Patent Office in relation to Chinese Application No. 201780050101 dated Jun. 9, 2020 (6 pages).
International Preliminary Report on Patentability issued by the European Patent Office acting as the International Preliminary Examining Authority in relation to International Application No. PCT/FI2017050559 dated Dec. 3, 2018 (6 pages).
International Search Report issued by the European Patent Office acting as the International Searching Authority in relation to International Application No. PCT/FI2017050559 dated Nov. 9, 2017 (4 pages).
Written Opinion of the International Searching Authority issued by the European Patent Office acting as the International Searching Authority in relation to International Application No. PCT/FI2017050559 dated Nov. 9, 2017 (6 pages).
Chilean Patent Application No. CL 2017001986 (filed Aug. 3, 2017), Applicant, Outotec (Finland) Oy, corresponding to WO2018024945 in English, previously cited and considered, 50 pages.
Chilean Patent No. 46607 B1 dated 2005-01-07 (corresponding to Chilean Patent Application No. CL 200400547), Patentee, OUTOTEC Oyj, corresponding to EP 1622724 in English, previously cited and considered, 29 pages.
Chilean Patent No. 41181 dated published May 15, 2001 (corresponding to Chilean Patent Application No. CL 199200931 (May 21, 2001), Patentee, Outokumpu Mintec Oy, corresponding to CA 2076473A1 in English, previously cited and considered, 12 pages.

* cited by examiner

FLOTATION LINE AND A METHOD

CROSS-REFERENCE TO RELATED APPLICATIONS

This application is a National Phase Entry of PCT International Application No. PCT/FI2017/050559 filed Jul. 28, 2017, which claims priority to PCT International Application No. PCT/FI2016/050552, filed Aug. 5, 2016, the disclosure of each of these applications is expressly incorporated herein by reference in their entirety.

FIELD OF THE INVENTION

The present disclosure relates to a flotation line and a flotation method for separating valuable metal containing ore particles from ore particles suspended in slurry.

SUMMARY OF THE INVENTION

In one aspect, a flotation line for treating mineral ore particles suspended in slurry is disclosed. The flotation line comprises at least three flotation units arranged in fluid connection with each other for allowing gravity-driven slurry flow between flotation units, and a feed inlet for supplying slurry into a first flotation unit; wherein at least three flotation units are configured to be uniplanar. Each flotation unit comprises at least one flotation cell, so that each flotation unit comprises at least one flotation cell equipped with a launder lip, at least one flotation cell equipped with a mixing apparatus, and at least one flotation cell equipped with a dispersed gas feeding mechanism. Further, each flotation cell equipped with a launder lip comprises a slurry inlet, a tailings outlet and a concentrate outlet. Further, the launder lip height of each uniplanar flotation unit is lower than the launder lip height of the preceding uniplanar flotation unit in the direction of the slurry flow, so that an angle of sloping β between a first uniplanar flotation cell, equipped with a launder lip and being larger than 150 m$^3$, and a last uniplanar flotation cell, equipped with a launder lip and being larger than 40 m$^3$, is formed. The angle β is 1.5 to 10 degrees relative to horizontal, and the angle β is calculated from the corresponding positions of the launder lip plane of said flotation cells.

The technical effects of the current disclosure include, first, that uniplanarity of at least three flotation units increases construction speed, simplifies planning and construction and thus reduces costs. Second, a drop in launder lip height within the uniplanar portion of the flotation line creates an angle of sloping to the material flow over the entire length of the uniplanar flotation line. The angle β is defined as the angle between horizontal and a line traversing corresponding positions of the first uniplanar flotation cell, equipped with a launder lip and being larger than 150 m$^3$, and of the last uniplanar flotation cell, equipped with a launder lip and being larger than 40 m$^3$ at the launder lip height. The line is drawn as a projection of the length L of the flotation line, in order to reflect the length of the flotation line in cases where the flotation cells are organized in a non-linear manner. The length L is measured from the inside wall of the first uniplanar flotation cell, at a point which in which the slurry is fed into the flotation cell, through the center of each uniplanar flotation cell's cross section, to the inside wall of the last uniplanar flotation cell at the point in which the tailings are released from the flotation line through a tailings outlet. The angle β is 1.5 to 10 degrees.

The uniplanarity of flotation units might offer advantages through reduction of investment costs, as setting up a plant requires less ground work and less space. This might be especially advantageous when the flotation cell size is increased. This again, might be desirable from the perspective of optimizing process performance while reducing capital costs for the investment.

Third, the first uniplanar flotation cell has a size of at least 150 m$^3$. This increases the capacity of the flotation line so during the construction phase there are less flotation cells required for the specified duty. Further, with this cell configuration the construction phase is shortened, and hence the overall capital costs are reduced.

Fourth, the reduction in launder lip height along the flotation line allows adjustment of material flow speed, the angle β indicating the overall flow rate, which can be modified through additional means within the flotation line.

At the same time flotation cell and/or flotation unit size may be decreased along the uniplanar flotation line to allow more efficient entrapment of valuable material-containing particles downstream where the amount of those particles in slurry decreases. Without limiting the current disclosure to any specific theory, the decrease in the amount of valuable material-containing particles might be due to the most easily entrapped particles, i.e. those with significant amounts of valuable material, and with suitable particle sizes, being removed already in the first unit at least to some extent.

Further, the reduction in launder lip height creates a hydraulic gradient forcing the flow of slurry towards the final tailings outlet of the flotation line. This might reduce the need for additional pumping. Further, pumping power requirement might be reduced as material flow is directed downstream gravitationally due to drop in launder lip height-induced angle. This can apply even to embodiments in which the fluid connections between adjacent flotation cells in the flotation line are at one level.

Yet another technical effect of the current flotation line is that introducing an angle of sloping allows control of froth overflow to launder. Additionally, the wearing of replaceable parts of the system (inlets, outlets, pipes, transfer means such as pumps) might be reduced.

In this application the following definitions apply regarding flotation. Flotation involves phenomena related to the relative buoyancy of objects. The term flotation includes all flotation techniques. Flotation can be for example froth flotation, dissolved air flotation (DAF) or induced gas flotation. Froth flotation is a process for separating hydrophobic materials from hydrophilic materials by adding gas, for example air, to process. Froth flotation could be made based on natural hydrophilic/hydrophobic difference or based on hydrophilic/hydrophobic differences made by addition of a surfactant or collector chemical. Gas can be added to the feedstock subject of flotation (slurry or pulp) by a number of different ways.

By a flotation line is herein meant an assembly comprising at least three flotation units that are arranged in fluid connection with each other for allowing gravity-driven slurry flow between flotation units. The flotation line is meant for treating mineral ore particles suspended in slurry by flotation. Thus, valuable metal-containing ore particles are recovered from ore particles suspended in slurry. Slurry is fed through a feed inlet to the first flotation unit of the flotation line for initiating the flotation process. Flotation line is a part of a larger assembly. Therefore, a number of different pre- and post-treatment devices may be in operational connection with the components of the flotation line, as is known to the skilled person.

By a flotation unit is herein meant a treatment unit within a flotation line. It comprises one or more flotation cells.

By a flotation cell is herein meant a tank in which a step of a flotation process is performed. A flotation cell is typically cylindrical in shape. The flotation cells regularly have a circular cross-section. The flotation cells may have a polygonal, such as rectangular, square, triangular, hexagonal or pentagonal, or otherwise radially symmetrical cross-section, as well. In the current disclosure, diameter d refers to the diameter of a flotation cell having a circular cross section. If the shape of the flotation cell deviates from circular, d is to be understood as referring to a flotation cell having a corresponding inside bottom surface area. Further, by a diameter d is herein meant the average diameter of the flotation cell between the bottom and the launder lip, unless otherwise stated.

A shape of a right prism can be envisaged. Thus, in many embodiments, the diameter of a flotation cell is constant in the vertical direction. In other words, a flotation cell has a launder lip height h and a diameter d. A flotation cell comprises a bottom and a side wall. A flotation cell comprises various components for effecting and regulating the flotation process. Such components may include, for example, one or more inlets, and outlets, a mixing apparatus, a launder lip and a dispersed gas feeding mechanism.

The number of uniplanar flotation units may vary. In one embodiment of the flotation line, the flotation line comprises three to ten uniplanar flotation units, or four to seven uniplanar flotation units larger than 40 $m^3$. For example three to ten uniplanar flotation units may be used in certain applications of the current flotation line. Especially, four to seven uniplanar flotation units may be used in certain applications of the current flotation line. Thus, it is possible that a flotation line comprises, for example five uniplanar flotation units. Alternatively, the flotation line may comprise eight uniplanar flotation units.

Similarly, the number of flotation cells may vary. In one embodiment of the flotation line, the flotation line comprises three to ten uniplanar flotation cells larger than 40 $m^3$, or four to seven uniplanar flotation cells larger than 40 $m^3$. For example three to ten uniplanar flotation cells may be used in certain applications of the current flotation line. Especially, four to seven uniplanar flotation cells may be used in certain applications of the current flotation line. Thus, it is possible that a flotation line comprises, for example five uniplanar flotation cells. Alternatively, the flotation line may comprise eight uniplanar flotation cells.

The relationship between the number of flotation units to flotation cells depends on how many flotation cells each flotation unit comprises. This again is chosen by the skilled person based on the specifics of each flotation line installation and is influenced by techno-economic factors of each site.

The uniplanar flotation units define a length L for the flotation line. The length is measured from the inside wall of the first uniplanar flotation cell, at a point which in which the slurry is fed into the flotation cell, through the center of each uniplanar flotation cell's cross section, to the inside wall of the last uniplanar flotation cell at the point in which the tailings are released from the flotation line through a tailings outlet.

In one embodiment of the flotation line, flotation cells comprising at least 80% of the uniplanar flotation cell volume have a launder lip height-to-cell diameter (h/d) ratio of less than 1.2, or less than 1.0, or 0.4 to 0.9. In one embodiment of the flotation line, the uniplanar flotation cells comprising a launder lip and being larger than 150 $m^3$ have a launder lip height-to-cell diameter (h/d) ratio of less than 1.2, or less than 1.0, or 0.4 to 0.9.

The launder lip height-to-cell diameter (h/d) ratio of the flotation cells may vary, and the selection of the optimal arrangement for each application needs to be done from techno-economic perspective to ascertain a functional process. However, a h/d ratio of less than 1.2 might offer advantages. The increase in diameter allows construction a lower flotation cell while retaining its volume. This again is reflected in the ease of construction, as the structure to be built is lower, which again will advantageously affect the speed of construction.

The launder lip height h of a flotation cell is measured from the lowest functional position of the flotation cell bottom to the launder lip. The bottom of a flotation cell is the structure on the inside of the flotation cell limiting the flotation cell from below. Thus, by a bottom is herein meant the inside bottom of the flotation cell, unless otherwise stated. The bottom is typically horizontal, and formed as a flat or concave structure. In some applications, the bottom might be tilted. By a lowest functional position of the bottom is herein meant the lowest position on the inside of the flotation cell, in which the slurry moves. If the flotation cell comprises a flat horizontal bottom, its lowest functional position is to be interpreted as being the center of the bottom.

A flotation unit may comprise two flotation cells. Alternatively, a flotation unit may comprise three flotation cells. Each flotation unit comprises at least one flotation cell equipped with a launder lip. Each flotation unit comprises at least one flotation cell equipped with a mixing apparatus. Each flotation unit comprises at least one flotation cell equipped with a dispersed gas feeding mechanism.

For example, it is possible, that a flotation unit comprises one flotation cell. In such a case, the one flotation cell comprises a launder lip, a mixing apparatus and a dispersed gas feeding mechanism. In one embodiment of the flotation line, a given uniplanar flotation cell is equipped with a launder lip, a mixing apparatus and a dispersed gas feeding mechanism. One or more uniplanar flotation cells equipped with a launder lip, a mixing apparatus and a dispersed gas feeding mechanism may exist also in a flotation unit comprising more than one flotation cell. The technical effect of incorporating a flotation cell equipped with a launder lip, a mixing apparatus and a dispersed gas feeding mechanism in one flotation cell is that using a single type of a flotation cell improves manufacturing efficiency and construction speed. It may also allow the rationalization of maintenance work, and simplify spare part predictions, thus reducing downtime of the flotation line.

In case a flotation unit comprises two flotation cells, the flotation cells may be termed a first flotation cell and a second flotation cell, the first flotation cell being the first one in the direction of the slurry flow. It is possible that both of the flotation cells comprise a launder lip, a mixing apparatus and a dispersed gas feeding mechanism. It is further possible that in a flotation unit comprising two flotation cells, the first flotation cell comprises a mixing apparatus and a dispersed gas feeding mechanism, and the second flotation cell comprises a launder lip. A flotation unit may also comprise three flotation cells. In such a case, the first and second flotation cells are followed by a third flotation cell in the direction of the slurry flow, and the launder lip, the mixing apparatus and the dispersed gas feeding mechanism may be divided between the flotation cells in various ways. For example, all flotation cells may comprise a launder lip, a mixing apparatus and a dispersed gas feeding mechanism. Alternatively, the second and third flotation cells may comprise a launder lip, and possibly a mixing apparatus and/or a dispersed gas feeding mechanism. The first flotation cell in such a case may comprise a mixing apparatus and/or a feeding mechanism.

A flotation unit has a launder lip height, H. In other words, if a flotation unit comprises two or more flotation cells comprising a launder lip, the launder lips are parallel to each other in a vertical direction. It is emphasized that if a flotation unit comprises two or more flotation cells, the launder lip heights of the flotation cells h do not need to be identical. In other words, the bottoms of the two or more flotation cells in a flotation unit may be at different levels in a vertical direction, but the launder lips are positioned on the same vertical level.

By a launder lip is herein meant the peripheral edge of a flotation cell at the upper part of the cell over which froth overflow with valuable material particles flows to a launder. The collected material is then discharged to further processing. In most embodiments, the launder lip is horizontal throughout its length. However, variations from horizontal direction might be necessary in some applications.

Each flotation cell equipped with a launder lip comprises a slurry inlet, a tailings outlet and a concentrate outlet. The slurry to be subjected to flotation flows into the flotation cell through the slurry inlet. The slurry from which at least a portion of the particles containing valuable material is removed through flotation exits the flotation cell through the tailings outlet. The concentrate outlet is used for discharging the collected valuable material-containing that have overflown the launder lip and are directed for further processing.

In the current disclosure, the launder lip height of each uniplanar flotation unit is lower than the launder lip height of the preceding uniplanar flotation unit in the direction of the slurry flow. This means that the first uniplanar flotation unit determines the highest flotation unit launder lip height.

By a mixing apparatus is herein meant any suitable means for agitating slurry within the flotation cell. The mixing apparatus may be a mechanical agitator. The mechanical agitator may comprise a rotor-stator with a motor and a drive shaft. In one embodiment of the flotation line, at least 80% of the volume of the uniplanar flotation cells comprising a mixing apparatus is mixed by a mechanical agitator. The technical effect of such an arrangement is that sufficient slurry flow is ascertained, improving the reliability of a system comprising flotation cells larger than 150 m$^3$, and reducing breaks in operation.

By a dispersed gas feeding mechanism is meant any suitable means for introducing gas into the slurry within the cell for effecting flotation. The gas may be, for example air or nitrogen. The dispersed gas feeding mechanism may be arranged in connection with the rotor and/or stator, or as a separate feed at lower part of cell, as is known in the art.

The fluid connection between flotation cells and flotation units may be direct, i.e. the two flotation cells (belonging to the same or different flotation units) may be immediately adjacent to each other. Alternatively, the two flotation cells may be positioned at a distance from each other and connected through a pipe, channel or other means known in the art. The fluid connection between flotation cells may comprise various regulation mechanisms.

According to the current disclosure, at least three flotation units in the flotation line are uniplanar. The flotation line may comprise further flotation units or flotation cells that are not uniplanar. Such flotation units or cells may be before the at least three uniplanar flotation units or after them.

By uniplanarity is herein meant that the bottoms of the flotation cells in the at least three uniplanar flotation units are within a vertical range, U, measured from the level of the bottom of the first flotation cell equipped with a launder lip and being larger than 150 m$^3$. U is determined by the equation U=±tan 1°×(distance between the lowest functional position of a first uniplanar flotation cell, equipped with a launder lip and being larger than 150 m$^3$, and the lowest functional position of a last uniplanar flotation cell, equipped with a launder lip and being larger than 40 m$^3$).

In other words, two lines starting from the lowest functional position of the bottom of the first uniplanar flotation cell, equipped with a launder lip and being larger than 150 m$^3$, are drawn along the length of the flotation line. The first line is at an angle of 1° relative to horizontal, and the second line is at an angle of −1° relative to horizontal. The following flotation units whose launder lip height H decreases, that are larger than 40 m$^3$ in size, and whose bottoms are at least partially inside the sector formed by the two lines are taken into account. The heights at which the lines cross the vertical line traversing the lowest functional position of the last flotation cell cross section determine the highest and lowest levels of the range U. If the flotation cells comprise a flat horizontal bottom, its lowest functional position is to be interpreted as being the center of the bottom.

For example, the bottoms of the uniplanar flotation units may all be positioned on the same vertical level, i.e. along the same horizontal line. It is to be understood that by being along the same horizontal line, some variation may be tolerated due to technical reasons relating to the accuracy of construction of the flotation line. Having the bottoms of the flotation cells aligned horizontally allows the full utilization of the advantages provided by the current disclosure. However, the advantages can be achieved to a large extent also by a system in which the flotation cells are constructed uniplanar according to the definition above.

The launder lip height of the first uniplanar flotation cell, equipped with a launder lip and being larger than 150 m$^3$, and the launder lip height of the last uniplanar flotation cell, equipped with a launder lip and being larger than 40 m$^3$, determine the angle of sloping R. The angle β is 1.5 to 10 degrees relative to horizontal. In one embodiment of the flotation line, the angle β is 2 to 6 degrees. For example, the angle may be 3 degrees. The technical effect of adjusting the angle of sloping β is that the properties of the specific application in question might benefit from a moderate slope. This might allow easier design of downstream flotation cells, since when reducing in flotation unit launder lip height, the effects on the volume and diameter of the flotation cells have to be taken into account, while the slurry flow dynamics and thus the efficiency of valuable material recovery are also influenced.

The angle β is calculated from the corresponding positions of the first uniplanar flotation cell, equipped with a launder lip and being larger than 150 m$^3$, and the launder lip height of the last uniplanar flotation cell, equipped with a launder lip and being larger than 40 m$^3$. For example, the center points of the cross section of the flotation cells on the level of the launder lip may be used. Alternatively, the first points on the circumference in the direction of the flotation line length on the launder lip level of each cell may be used. Also the corresponding last points may be used. It is not necessary for the two flotation cells used for the calculation to have the same diameter, or even the same shape of cross section. In one embodiment of the flotation line, the angle β is calculated from the center of the launder lip plane of said flotation cells.

In one embodiment of the flotation line, the launder lip height H of each uniplanar flotation unit is at least 400 mm, preferably 600 mm, lower than the launder lip height H of the preceding uniplanar flotation unit. For example, the launder lip height H of each uniplanar flotation unit is at least 400 mm lower than the launder lip height H of the preceding uniplanar flotation unit. As another example, the launder lip height H of each uniplanar flotation unit is at least 600 mm lower than the launder lip height H of the preceding uniplanar flotation unit. For example, the launder lip height H of each uniplanar flotation unit is 500 or 600 mm lower than the launder lip height H of the preceding uniplanar flotation unit. The larger the lip height difference is, the narrower connection is sufficient to effect the fluid connection between two flotation cells. Thus, using a sufficiently large launder lip height difference allows the use of smaller parts, simplifying and speeding up the installation procedure. Further, the magnitude of the launder lip height difference influences the bulkiness of the slurry level control mechanisms used for additional regulation of flow between the flotation cells.

In one embodiment of the flotation line, the tailings outlet of a uniplanar flotation cell equipped with a launder lip is connected to a slurry inlet of a subsequent uniplanar flotation cell equipped with a mixing apparatus. Such an arrangement leads to prompt re-mixing of the slurry after froth formation, i.e separation of a proportion of valuable material. This again might reduce sanding of the flotation cells and improve flotation efficiency. The mixing apparatus may be connected to a dispersed gas feeding mechanism to initiate a new round of flotation.

In one embodiment of the flotation line, the fluid connection is a direct connection between an outlet of a preceding uniplanar flotation unit and an inlet of the subsequent uniplanar flotation unit in the direction of the slurry flow. A direct contact reduces the need for piping between two adjacent flotation cells. Thus, it reduces the need for components during construction of the flotation line, speeding up the process. Further, it might reduce sanding and simplify maintenance of the flotation line.

In one embodiment of the flotation line, the fluid connections between the uniplanar flotation units larger than 40 m$^3$ are uniplanar. For example, the inlets and outlets of each flotation cell may be arranged at a same level in vertical direction of the flotation cell wall. Typically, the fluid connections are horizontal. However, some deviations from horizontal can be envisaged, while retaining the functionality of the fluid connections. Uniplanar connection between adjacent uniplanar flotation units simplifies the installation procedure, since all the connections to the flotation cells are in a similar size range.

The flotation line according to the current disclosure allows the construction of large flotation cells. The flotation line may comprise flotation cells in the range of 400 m$^3$, 700 m$^3$, 1,000 m$^3$ or even larger. In one embodiment of the flotation line, the size of at least one uniplanar flotation cell equipped with a launder lip is at least 400 m$^3$. In an embodiment, the size of one uniplanar flotation cell equipped with a launder lip is at least 400 m$^3$. Constructing a single or only a few large flotation cells might improve efficiency. Constructing the foundation of a large flotation cell requires more planning and expertise, and is thus slower than constructing a foundation for a smaller flotation cell.

Constructing a large first uniplanar flotation cell has the technical effect that the installation speed is increased, since bulky material is necessary only in one place, and the construction of the flotation cells throughout the flotation line might require less coordination.

Especially the first uniplanar flotation cell equipped with a launder lip may be large, for example having a size of at least 200 m$^3$. In one embodiment of the flotation line, the size of the first uniplanar flotation cell, equipped with a launder lip is at least 400 m$^3$. The size the first uniplanar flotation cell equipped with a launder lip may also be at least 500 m$^3$.

In one embodiment of the flotation line, the launder lip height h of the first flotation cell, equipped with a launder lip is at least 6 m.

Larger flotation cells may be more efficient and allow savings through economy of scale, as capital expenditure is lower when a smaller number of units in is needed in a flotation line in order to reach a given throughput.

Constructing the flotation cell or cells of the second uniplanar flotation unit in the direction of the slurry flow smaller than the flotation cell or cells in the first uniplanar flotation unit might provide efficiency benefits, as the foundation of a smaller flotation cell is simpler to construct than that of a larger flotation cell. In one embodiment of the flotation line, the at least one flotation cell of the second uniplanar flotation unit in the direction of the slurry flow is smaller than the at least one flotation cell of the first uniplanar flotation unit. In one embodiment of the flotation line, the at least one flotation cell of the second uniplanar flotation unit is at least 10% smaller than the at least one flotation cell of the first uniplanar flotation unit. In yet another embodiment of the flotation line, the at least one flotation cell of the third uniplanar flotation unit in the direction of the slurry flow is at least 30% smaller than the at least one flotation cell of the first uniplanar flotation unit.

Thus, the technical effect provided by such an embodiment is that the flotation line will comprise a fewer number of flotation cells with a foundation. Alternatively or in addition, it might be possible to construct a larger number of flotation cells without a foundation. Therefore, the construction of such a flotation line is faster and its material costs might be reduced. The effect might be especially pronounced if the flotation cell or flotation cells in the second uniplanar flotation unit are at least 10% smaller than in the first uniplanar flotation unit. For example, it is possible that the at least one flotation cell of the second uniplanar flotation unit is at least 20 or 30% smaller than the at least one flotation cell of the first uniplanar flotation unit.

The diameter of a flotation cell affects the slurry flow dynamics inside the flotation cell, which again is reflected in the specifics of the mixing apparatus chosen. In one embodiment of the flotation line, at least 80% the uniplanar flotation cells have a diameter d of at least 3.5 m, or wherein at least 80% the uniplanar flotation cells have a diameter d of at least 6 m.

In one embodiment of the flotation line, at least 80% the uniplanar flotation cells have a diameter d of 3.5 to 25 m, or wherein at least 80% of the uniplanar flotation cells have a diameter d of 6 to 20 m.

As the size of a flotation cell increases, the diameter increases as well. This is especially pronounced for uniplanar flotation cells, for which the launder lip height gradually decreases along the flotation line length in the direction of the slurry flow. Further, the construction of a wider flotation cell in relation to its height is faster and simpler.

Thus, at least 80% of the uniplanar flotation cells in a flotation line might have a diameter of at least 3.5 m. Alternatively, at least 80% of the uniplanar flotation cells in a flotation line might have a diameter of at least 6 m. In other words, for example 80 or 90% of the uniplanar flotation cells might have a diameter of at least 3.5 m or of 6 m. In such a flotation line, the diameter of the majority of the flotation cells exceeds the threshold value. The rest of the uniplanar flotation cells may be larger or smaller.

In some embodiments, the diameter of the uniplanar flotation cells varies between 3.5 m and 25 m. It might vary, for example, between 6 m and 20 m. In such embodiments, the diameter of at least 80% of the uniplanar flotation cells is within said range. The rest of the uniplanar flotation cells may be larger or smaller.

In one embodiment of the flotation line, at least 80% of the volume of the third and further uniplanar flotation units is formed of flotation cells whose diameter d is at least 0.4, or 0.8 to 1.2, times the diameter of the average of the uniplanar flotation cells in the second uniplanar flotation unit. As the launder lip height of flotation units along the flotation line progressively decreases, it might offer advantages in certain embodiments to retain the diameter of the flotation cells further along the flotation line at a given level relative to the second flotation unit. This would in effect lead into moderate decrease in the flotation cell size. For example, at least 80% of the volume of the third and further uniplanar flotation units is formed of flotation cells whose diameter is at least 0.4 times the diameter of the average of the uniplanar flotation cells in the second uniplanar flotation unit. Especially the above relationship may be 0.8 to 1.2. When the diameters of the flotation cells within the flotation line are within the ranges indicated above, the construction work is simplified, as the ground work for each flotation cell can be streamlined. In other words, similar construction techniques and materials can be used. Further, it might also be possible to approximate the size required for construction, thus allowing the repetition of similar work phases for more than one flotation cell. All this speeds up construction work, since less planning and adjustment is needed.

In addition to large uniplanar flotation cells, also smaller ones, down to 40 m$^3$ may be used, to optimize the valuable material recovery process. The flotation line may comprise additional flotation cells, which may be still smaller.

In one embodiment of the flotation line, the at least one flotation cell in a uniplanar flotation unit is a froth flotation cell.

In one aspect, a flotation method for treating mineral ore particles suspended in slurry in a flotation line according to the current disclosure is disclosed. The method comprises introducing slurry into the flotation line; treating the slurry in the flotation cells of the flotation units for at least partial recovery of valuable metal containing particles from the slurry; leading the slurry to pass from a preceding flotation unit to a successive flotation unit via a fluid connection; and removing tailings from the flotation line though a tailings outlet of a last flotation unit of the flotation line.

The flotation method according to the present disclosure has the technical effect of allowing the flexible recovery of various particle sizes. The advantages provided by the structure of the flotation line allow the accurate adjustment of the flotation line structural parameters according to the target valuable material at each installation.

In one embodiment of the flotation method, the flotation line further comprises a conditioner arranged upstream of the first uniplanar flotation cell, and wherein the slurry is treated in the conditioner prior to introducing into the flotation line.

In one embodiment of the flotation method, density of the slurry to be treated is 1.1 to 1.7 t/m$^3$. Slurry with such density is challenging to treat, as the particles suspended in it typically are heavy, and have an abrasive shape. On the one hand, the heaviness leads to quick particle sedimentation, making efficient mixing important. On the other hand, the abrasiveness may lead to fast wearing of the machinery at excessive slurry flow speeds.

In one embodiment of the flotation method, the slurry comprises mineral ore particles having a P80 of 10 to 2,000 μm. The denotation P80 of 10 to 2,000 μm is used in the art, and means that 80% of the particles in the slurry have a size between 10 μm to 2,000 μm. Established methods are used for determining this value.

The embodiments of the invention described herein may be used in any combination with each other. Several of the embodiments may be combined together to form a further embodiment of the invention. An apparatus, or a method, or a use, to which the invention is related, may comprise at least one of the embodiments of the invention described herein.

BRIEF DESCRIPTION OF THE DRAWINGS

The accompanying drawings, which are included to provide further understanding of the invention and constitute a part of this specification, illustrate embodiments of the invention and together with the description help to explain the principles of the invention.

In the drawings.

DETAILED DESCRIPTION OF THE INVENTION

Reference will now be made in detail to the embodiments of the present invention, examples of which are illustrated in the accompanying drawings.

Although flotation is disclosed in the following examples by reference to froth flotation, it should be noted that the principles according to the invention can be implemented regardless of the specific type of the flotation, i.e. the flotation technique can be any of the known per se flotation techniques, such as froth flotation, dissolved air flotation or induced gas flotation.

FIGS. 1-4 illustrate a flotation line 1 in a schematic manner. The figures are not drawn to proportion, and many of the components of the flotation line 1 are omitted for clarity. The direction of slurry flow is depicted in each of FIGS. 1 to 4 by an arrow and a text "flow".

Figure 1:
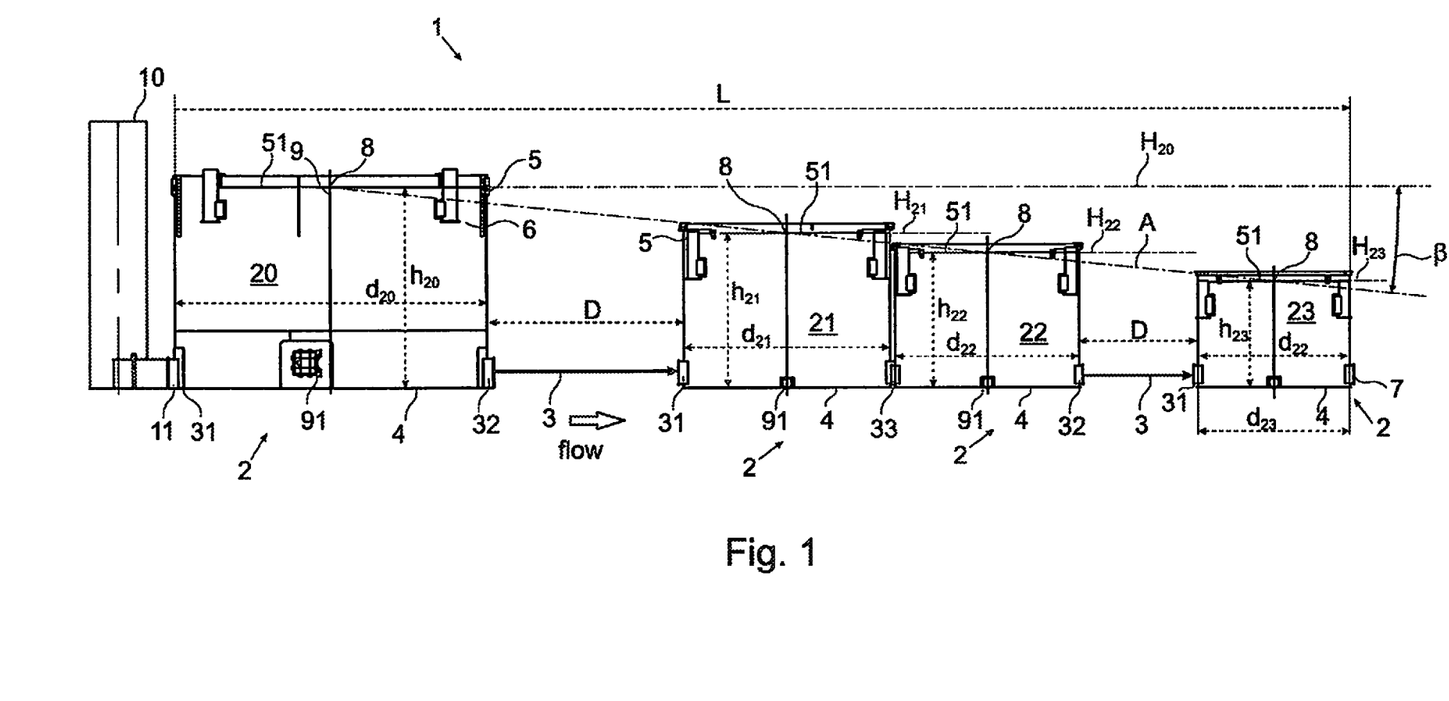
FIG. 1 is a schematic presentation of an exemplary embodiment of the flotation line according to the current disclosure.

In the embodiment of FIG. 1, the flotation line 1 comprises four uniplanar flotation units 2, defining a length L for the uniplanar flotation line. A conditioner tank 10 is depicted in FIG. 1, and other pre-treatment devices relating to earlier process phases, such as diminution, grinding, classification, may be present. Also further flotation units, which are not uniplanar, may be present. The additional devices may be positioned before, after or between the uniplanar flotation units 2.

The conditioner tank 10 is connected to the first uniplanar flotation cell 20 by a feed inlet 11 and a cell inlet 31. The uniplanar flotation cells 20, 21, 22, 23 are connected to each other by fluid connections 3. In FIG. 1, the fluid connection between the flotation cells 20 and 21 is formed as a piping, since the two flotation cells are positioned at a distance D from each other. The slurry flows through cell outlet 32 of flotation cell 20 to the cell inlet 31 of flotation cell 21. A corresponding system is arranged between flotation cells 22 and 23, since also they are separated from each other by a distance D. In contrast, the flotation cells 21 and 22 are connected by a direct connection 33, as the flotation cells 21, 22 are right next to each other. The tailings exit the flotation line 1 through a tailings outlet 7. All details and components of the fluid connections between the flotation cells 20, 21, 22, 23 are omitted.

In the embodiment of FIG. 1, the bottoms 4 of all the uniplanar flotation cells 20, 21, 22, 23 are on the same vertical level. Thus, all the uniplanar flotation cells 20, 21, 22, 23 are uniplanar.

Each uniplanar floatation cell 20, 21, 22, 23 comprises a mixing apparatus comprising a shaft 9 and a dispersed gas feeding mechanism 91. The shaft is positioned along the vertical centerline of the flotation cell 20, 21, 22, 23 diameter. In the flotation cell 20, the dispersed gas feeding mechanism 91 is located at the side of the shaft, whereas in the flotation cells 21, 22, 23, the dispersed gas feeding mechanism 91 is concentric with the shaft 9. The skilled person is able to select a suitable dispersed gas feeding mechanism according to the specifics of the embodiment. The size of the dispersed gas feeding mechanism may vary.

Each uniplanar flotation cell 20, 21, 22, 23 comprises an overflow launder 5, which again comprises a launder lip 51, at a height $h_{20}$, $h_{21}$, $h_{22}$, $h_{23}$, from the bottom 4. The launder lip 51 determines the launder lip height $H_{20}$, $H_{21}$, $H_{22}$, $H_{23}$, which is the highest for the first uniplanar flotation unit 2, and decreases for every subsequent uniplanar flotation unit 2 in the direction of the slurry flow. The flotation unit launder lip height H may be calculated from the lowest uniplanar flotation cell in the flotation line, or from any other suitable height, as long as it is done consistently throughout the flotation line. The flotation unit launder lip height H allows the determination of an angle β.

Each flotation cell 20, 21, 22, 23 has a diameter $d_{20}$, $d_{21}$, $d_{22}$, $d_{23}$. By the diameter $d_{20}$, $d_{21}$, $d_{22}$, $d_{23}$ is herein meant the average inside diameter of the uniplanar flotation cell 20, 21, 22, 23 between the lowest functional position of the bottom 4, and the launder lip 51. This diameter d can be used for determining the effective volume of the flotation cell 20, 21, 22, 23. The center of the uniplanar flotation cell 20, 21, 22, 23 on the launder lip height 8 may be used for calculating the angle β, as was done in the embodiment of FIG. 1, as well as for determining the uniplanarity of a given flotation cell 20, 21, 22, 23. The determination of the angle β is depicted by line A traversing the centers of the first uniplanar flotation cell 20 and the last uniplanar flotation cell 23 at the height of the launder lip 51.

The diameter d of the uniplanar flotation cells 20, 21, 22, 23 decreases in the direction of the slurry flow.

Table 1 describes the dimensions of the flotation line presented in FIG. 1. As depicted in table 1, the volume of the first uniplanar flotation cell 20 is 630 m³ and the volume of the second uniplanar flotation cell 21 is 200 m³. The volume of the third uniplanar flotation cell 22 is 130 m³ and the volume of the fourth uniplanar flotation cell 23 is 70 m³.

The value given in the height column in table 1, and in all the following tables, refers to the launder lip height $h_{20}$, $h_{21}$, $h_{22}$, $h_{23}$ of the uniplanar flotation cell 20, 21, 22, 23, as measured from the flotation cell bottom 4 to the launder lip 51. The value given in the diameter column refers to the diameter $d_{20}$, $d_{21}$, $d_{22}$, $d_{23}$ of the uniplanar flotation cell 20, 21, 22, 23. Drop is the change in launder lip height H between two subsequent uniplanar flotation units 2.

The launder lip height of the uniplanar flotation cells 20, 21, 22, 23 gradually decreases along the flotation line 1 in the direction of the slurry flow. The launder lip height 51 of the first uniplanar flotation cell 20 is 7 m, whereas that of the second uniplanar flotation cell 21 is 5.4 m, the drop thus being 1.6 m. The launder lip height 51 of the third uniplanar flotation cell 22 is 4.7 m, resulting in a drop of 0.7 m. The launder lip height 51 of the fourth uniplanar flotation cell 23 is 3.5 m, i.e. 1.2 m less than for the previous flotation cell. The diameter of the uniplanar flotation cells 20, 21, 22, 23 is 11 m for the first, 7.2 for the second, 6.4 for the third, and 5.3 for the third flotation cell.

An angle of launder lip height drop over the whole of the length L of the uniplanar flotation line 1 is defined as the angle β, calculated over the entire uniplanar flotation line length, i.e. the length the slurry flow travels over the flotation line from the feed inlet 11 to the tailings outlet 7. Angle β is, in this example, the angle between the launder lip height $H_{20}$ of the first uniplanar flotation cell 20, and the line A traversing the center of the uniplanar flotation cell 20 cross section at the launder lip 51 height, and the corresponding position (i.e center of the flotation cell cross section at launder lip level) at the fourth uniplanar flotation cell 23. The angle β of the uniplanar flotation line 1 in this example is approximately 6°.

TABLE 1

Dimensions of the uniplanar flotation line 1 in FIG. 1.

| Flotation cell | Vol. m³ | H, mm | d, mm | D, mm | Drop, mm |
|---|---|---|---|---|---|
| 1 (20) | 630 | 7,000 | 11,000 | — | — |
| 2 (21) | 200 | 5,400 | 7,200 | 5,900 | 1,600 |
| 3 (22) | 130 | 4,700 | 6,400 | 500 | 700 |
| 4 (23) | 70 | 3,500 | 5,300 | 4,000 | 1,200 |
| Sum | | | 29,900 | 10,400 | 3,500 |

In the embodiment of FIG. 1, the length of the uniplanar flotation line is thus the sum of all flotation cell diameters (29,900 mm) and the distances between the flotation cells (10,400 mm), i.e. 40,300 mm (40.3 m). In this, and in all the following examples, a distance of 500 mm is calculated for the machinery needed to regulate the slurry flow between the flotation cells that are directly next to each other. As the decrease in the flotation unit launder lip height H (drop) is 3,500 mm (3.5 m), the angle β is 5°.

The slurry is conducted to the uniplanar flotation line 1 by leading it through a feed inlet 11 connected to the cell inlet 31 of the first uniplanar flotation unit 2 of the flotation line 1. The slurry is allowed to flow through the flotation line 1 via the fluid connections 3, 33. The tailings from the last uniplanar flotation unit 2 of the flotation line 1 are lead out of the flotation line 1 via a tailings outlet 7 and may be further treated in conventional manner.

Figure 2:
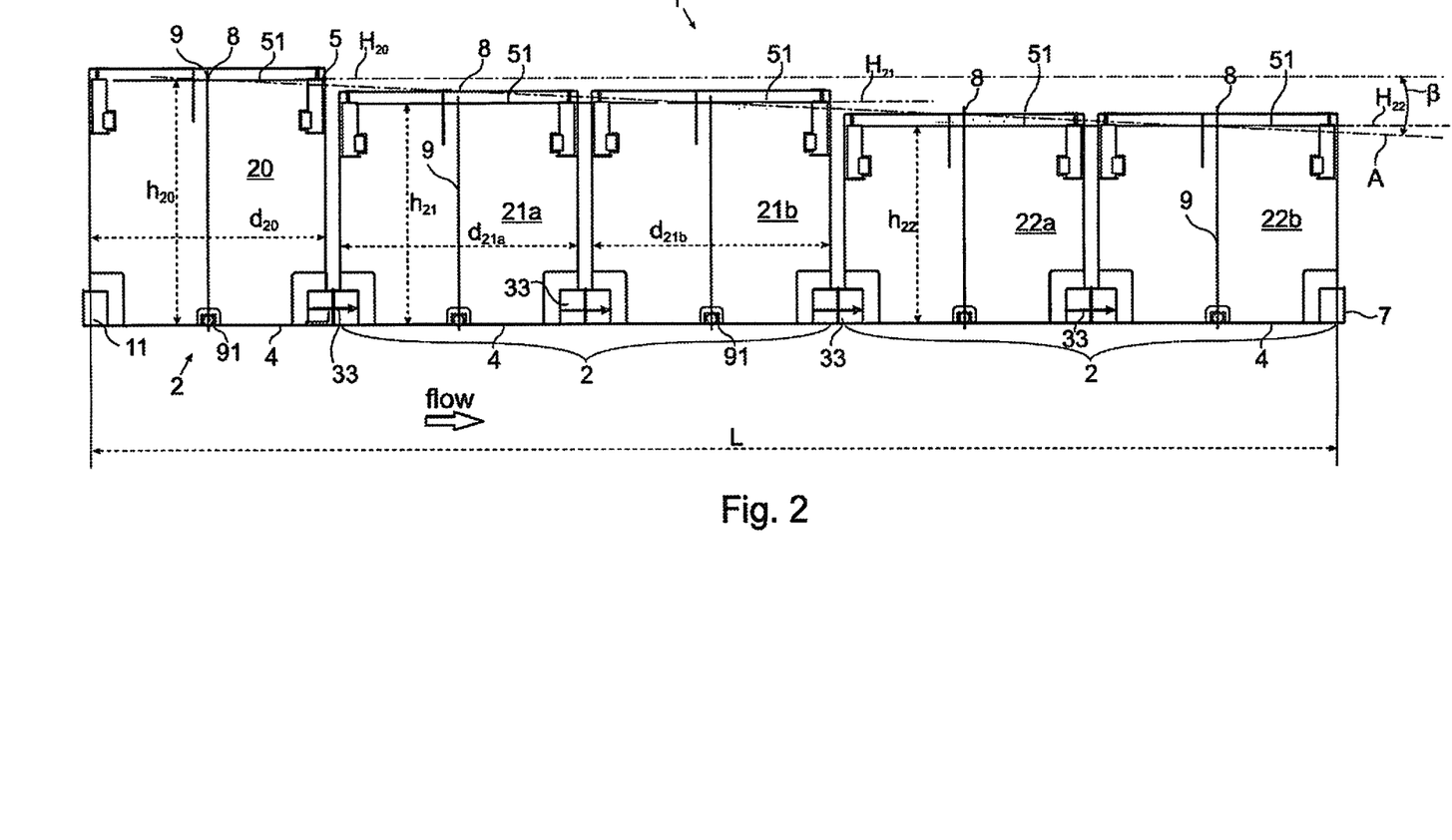
FIG. 2 is a schematic presentation of another exemplary embodiment of the flotation line according to the current disclosure.

The embodiment of FIG. 2 resembles that of FIG. 1, so not all features presented for FIG. 1 are repeated. The embodiment comprises three uniplanar flotation units 2, the first of which comprises one flotation cell 20. The second and third uniplanar flotation units 2 comprise two flotation cells 21a, 21b, 22a, 22b each. In FIG. 2, the bottoms 4 of all uniplanar flotation cells 20, 21a, 21b, 22a, 22b are positioned on the same vertical level.

Each uniplanar flotation unit 2 has its launder lip height $H_{20}$, $H_{21}$, $H_{22}$. The flotation cell launder lip height h of the two flotation cells 21a, 21b and 22a, 22b in each uniplanar flotation unit 2 is equal. However, if the bottoms 4 of the two flotation cells 21a, 21b, 22a, 22b in one uniplanar flotation unit were on different levels, the launder lip height h for these flotation cells 21a and 21b, 22a and 22b would be different, so that the launder lip height H of the uniplanar flotation unit 2 remains unambiguous.

All the uniplanar flotation cells 20, 21a, 21b, 22a, 22b are connected through direct connections 33. Thus, the flotation cells 20, 21a, 21b, 22a, 22b are separated from each other by a minimal distance due to the space taken by the direct connection 33 arrangement.

The dimensions of the flotation line 1 depicted in FIG. 2 are given in table 2. The volume of the first uniplanar flotation cell 20, forming the first uniplanar flotation unit 2, is 380 m³. The volume of each flotation cell 21a, 21b in the second uniplanar flotation unit 2 is 340 m³, whereas the volume of the flotation cells 22a, 22b in the third uniplanar flotation unit is 300 m³. The launder lip height $H_{20}$ of the first uniplanar flotation unit 2 is 8.61 m. The launder lip height $H_{21}$ of the second uniplanar flotation unit 2 is 0.8 m lower, i.e. 7.81 m. A reduction in launder lip height of 0.71 m, to 7.1 m takes place between the second and third uniplanar flotation unit 2.

In the embodiment of FIG. 2, the diameter of the uniplanar flotation cells remains constant, at 8 m.

TABLE 2

Dimensions of the flotation line 1 in FIG. 2.

| Flotation cell | Vol., m³ | H, mm | d, mm | D, mm | Drop, mm |
|---|---|---|---|---|---|
| 1 (20) | 380 | 8,610 | 8,000 | — | — |
| 2 (21a) | 340 | 7,810 | 8,000 | 500 | 800 |
| 2 (21b) | 340 | 7,810 | 8,000 | 500 | — |
| 3 (22a) | 300 | 7,100 | 8,000 | 500 | 710 |
| 3 (22b) | 300 | 7,100 | 8,000 | 500 | — |
| Sum | | | 40,000 | 2,000 | 1,510 |

In the embodiment of FIG. 2, the length of the uniplanar flotation line is thus the sum of all flotation cell diameters (40,000 mm) and the distances between the flotation cells (2,000 mm), i.e. 42,000 mm (42.0 m). As the decrease in the flotation unit launder lip height H (drop) is 1,510 mm (1.51 m), the angle β is 2°.

The angle of launder lip height reduction over the whole of the length L of the uniplanar flotation line 1 is defined as the angle β, calculated over the entire uniplanar flotation line length L, i.e. the length the slurry flow travels over the flotation line from the feed inlet 11 of the first uniplanar flotation cell 20 to the tailings outlet 7 of the last uniplanar flotation cell 22b. Angle β is, in this embodiment, the angle between the launder lip height $H_{20}$ of the first flotation cell 20, and the line A traversing the center 8 of the first uniplanar flotation cell 20 at the launder lip 51 height, and the corresponding position of the last uniplanar flotation cell 22b.

Figure 3:
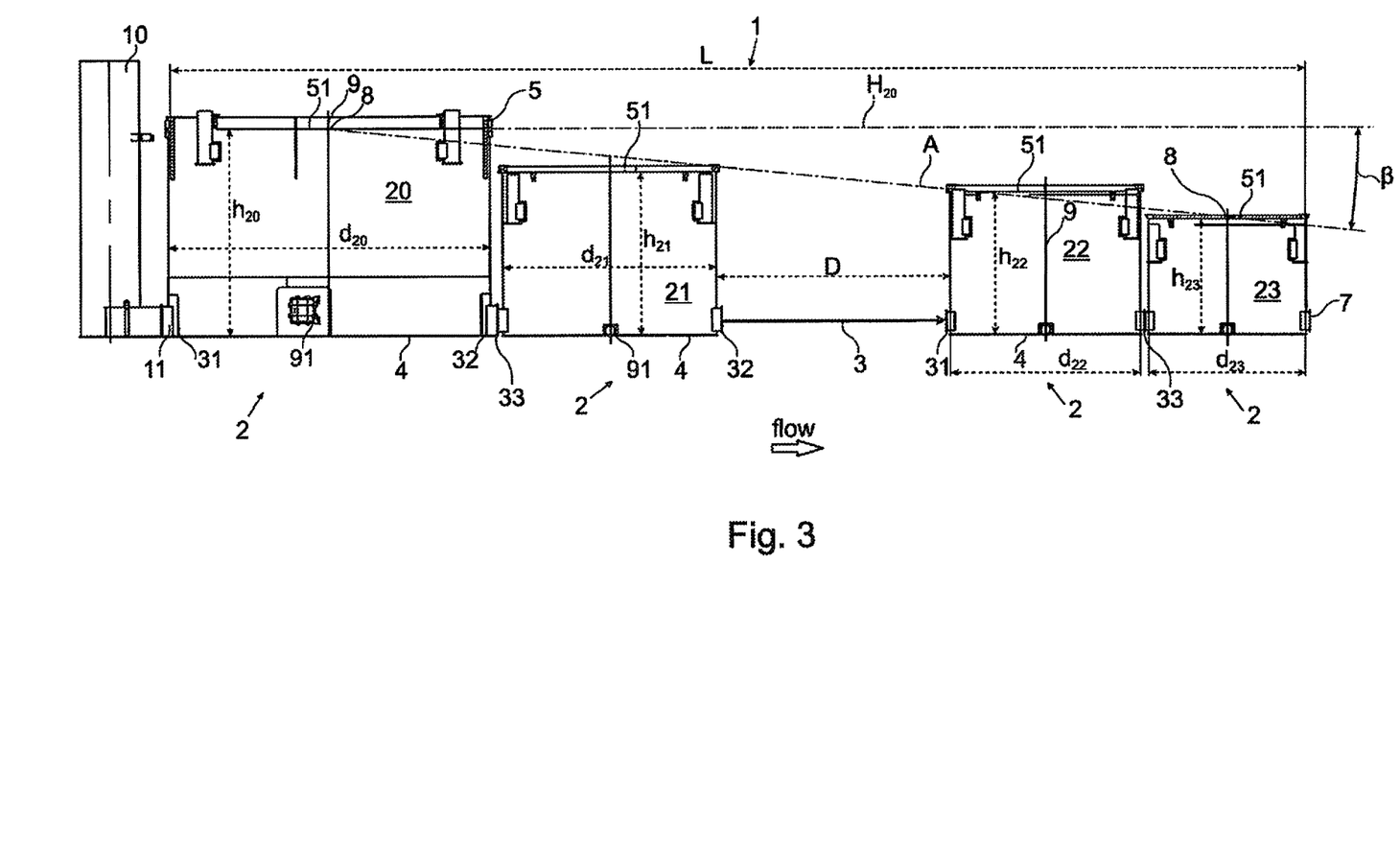
FIG. 3 is a schematic presentation of yet another exemplary embodiment of the flotation line according to the current disclosure.

The embodiment of FIG. 3 resembles those of the previous figures. A conditioner tank 10 has been included in the drawing. The embodiment comprises four uniplanar flotation units 2, all of which comprise one flotation cell 20, 21, 22, 23. The fluid connections between the first two uniplanar flotation cells 20, 21, and between the two last uniplanar flotation cells, 22, 23, are arranged as a direct connections 33. The connection between the second and third uniplanar flotation cell 21, 22 comprises piping, and the two uniplanar flotation cells are separated by a distance D.

In Table 3, dimensions of the uniplanar flotation units 2 are given for the flotation line 1 of FIG. 3. The volume of the first uniplanar flotation cell 20 is 630 m³, and the volume of the subsequent uniplanar flotation cells 21, 22, 23 decreases to 200 m³, 130 m³ and to 70 m³. At the same time, the launder lip height 51 decreases from 6.6 m for the first uniplanar flotation cell 20 to 5.4 m for the second, to 4.7 for the third and to 3.7 for the fourth uniplanar flotation cell 21, 22, 23, respectively. Thus, the first decrease in launder lip height 51 is 1.2 m, the second 0.7 m and the third 1.0 m. The diameter of the uniplanar flotation cells also decreases from 11.0 m for the first uniplanar flotation cell, through 7.2 m and 6.4 m for the second and third, to 5.3 m for the fourth uniplanar flotation cell 23.

TABLE 3

Dimensions of the flotation line 1 in FIG. 3.

| Flotation cell | Vol., m³ | H, mm | d, mm | D, mm | Drop, mm |
|---|---|---|---|---|---|
| 1 (20) | 630 | 6,600 | 11,000 | — | — |
| 2 (21) | 200 | 5,400 | 7,200 | 500 | 1,200 |
| 3 (22) | 130 | 4,700 | 6,400 | 8,000 | 700 |
| 4 (23) | 70 | 3,700 | 5,300 | 500 | 1,000 |
| sum | | | 29,900 | 9,000 | 2,900 |

In the embodiment of FIG. 3, the length of the uniplanar flotation line is thus the sum of all flotation cell diameters (29,900 mm) and the distances between the flotation cells (9,000 mm), i.e. 38,900 mm (38.9 m). As the decrease in the flotation unit launder lip height H (drop) is 2,900 mm (2.9 m), the angle β is 4.3°.

Figure 4:
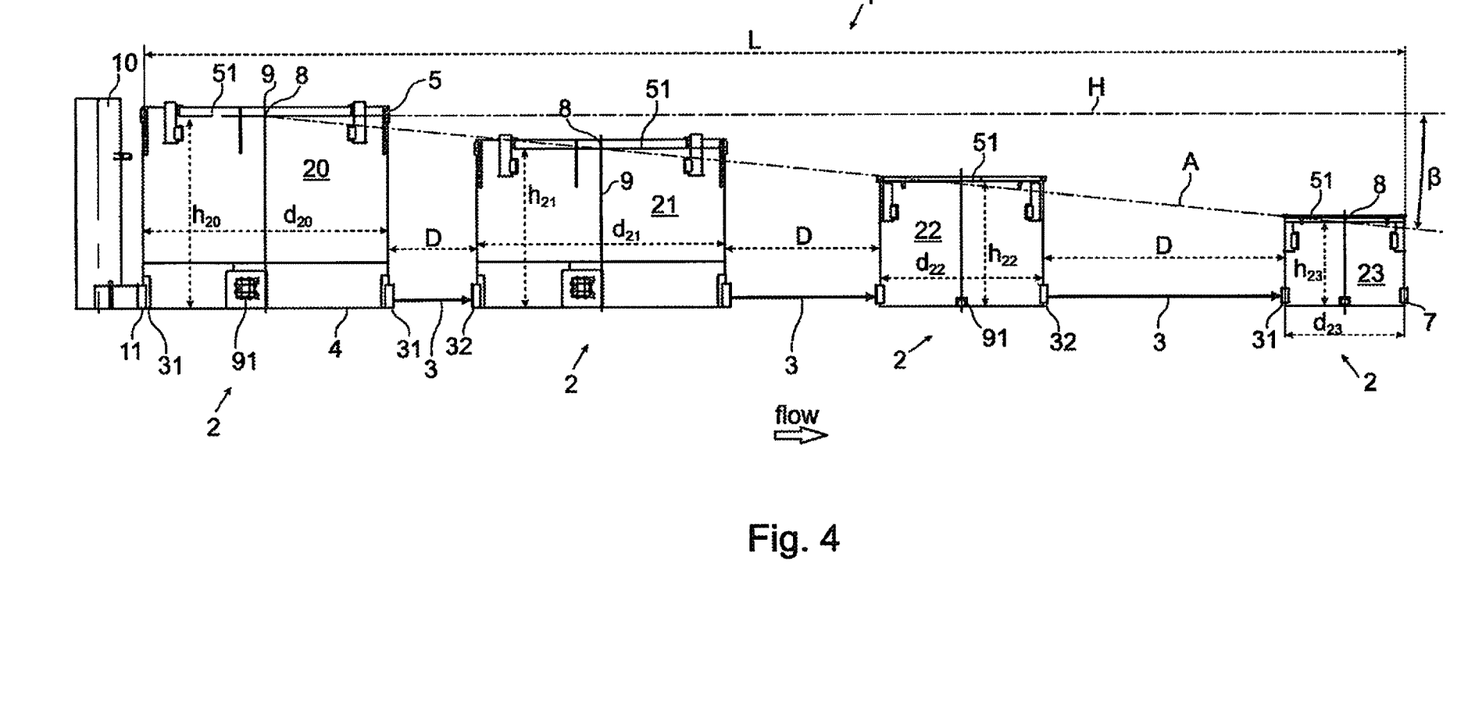
FIG. 4 is a schematic presentation of yet another exemplary embodiment of the flotation line according to the current disclosure.

In the embodiment of FIG. 4, the flotation line comprises four uniplanar flotation units 2, each comprising one flotation cell 20, 21, 22, 23. All the flotation units 2 are connected through piping 3, which is of different length between every flotation unit 2, reflecting the difference in the distance D between the flotation units 2.

In Table 4, dimensions of uniplanar flotation units 2 for the embodiment in FIG. 4 are given. The volume of the first uniplanar flotation cell 20 is 775 m³ and that of the second 21 is 630 m³. The volume of the third uniplanar flotation cell 22 is 200 m³ and that of the fourth 23 is 70 m³. The diameter of the first two uniplanar flotation cells 20, 12 is 11 m, the diameter of the third uniplanar flotation cell 22 is 7.2 m, and the diameter of the fourth uniplanar flotation cell is 5.3 m.

The launder lip 51 height $h_{20}$ of the first uniplanar flotation cell 20 is 8.91 m, and that $h_{21}$ of the second uniplanar flotation cell 21 is 7.0 m, with a reduction in height being 1.91 m. The launder lip 51 height $h_{22}$ of the third uniplanar flotation cell 22 is 5.4 m, with a 1.6 m reduction in height. The fourth uniplanar flotation cell 23 has a launder lip 51 height $h_{23}$ of 3.5 m, with a reduction of 1.9 m to the previous flotation cell.

TABLE 4

Dimensions of the flotation line 1 in FIG. 4.

| Flotation cell | Vol., m$^3$ | H, mm | d, mm | D, mm | Drop, mm |
|---|---|---|---|---|---|
| 1 (20) | 775 | 8,910 | 11,000 | — | — |
| 2 (21) | 630 | 7,000 | 11,000 | 3,900 | 1,910 |
| 3 (22) | 200 | 5,400 | 7,200 | 6,800 | 1,600 |
| 4 (23) | 70 | 3,500 | 5,300 | 10,700 | 1,900 |
| Sum | | 34,500 | 21,400 | | 5,410 |

In the embodiment of FIG. 4, the length of the uniplanar flotation line is thus the sum of all flotation cell diameters (34,500 mm) and the distances between the flotation cells (21,400 mm), i.e. 55,900 mm (55.9 m). As the decrease in the flotation unit launder lip height H (drop) is 5,410 mm (5.41 m), the angle β is 5.5°.

FIG. 5, panels a to d, illustrates various exemplary horizontal arrangements of a flotation line 1. Only the cross-sectional outline of the flotation cells 20, 21, 22, 23 is depicted. Although not directly visible in FIG. 5, all the flotation cells in the figure are uniplanar, as they are used for calculating the length L. Further, in FIG. 5, all flotation cells 20, 21, 22, 23 are considered to comprise a launder lip 51, making it irrelevant for the calculation of length L how the flotation cells 20, 21, 22, 23 are arranged into flotation units 2.

Figure 5A:
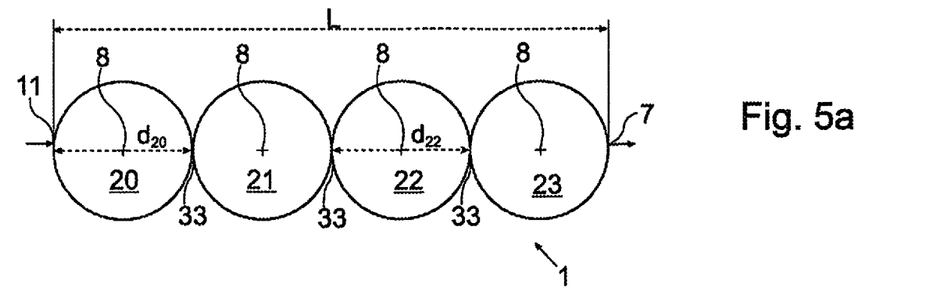
FIGS. 5a, 5b, 5c and 5d are a schematic presentation of exemplary horizontal arrangements of the flotation line according to the current disclosure.

In panel 5a, the flotation cells 20, 21, 22, 23 are organized in a straight line, and each fluid connection is formed as a direct connection 33.

Figure 5B:
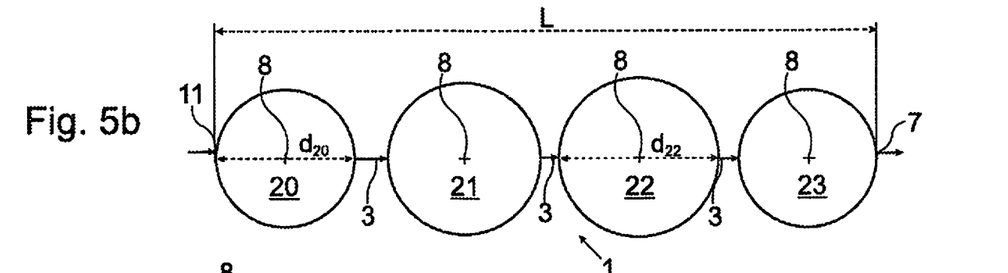

In panel 5b, the flotation cells 20, 21, 22, 23 are organized in a straight line, and each fluid connection is formed as a fluid connection 3 comprising piping. The flotation cells 20, 21, 22, 23 are spaced apart by a distance D, which is the longest between flotation cells 20 and 21. However, it would be possible that the distance D between all flotation cells 20, 21, 22, 23 would be equal.

In the embodiment of panel 5b, the diameter of the flotation cells 20, 21, 22, 23 varies, so that the third uniplanar flotation cell 22 has the largest diameter.

Figure 5C:
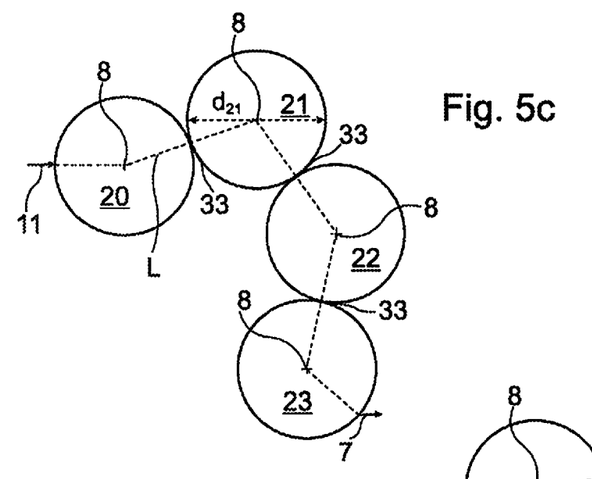
Figure 5D:
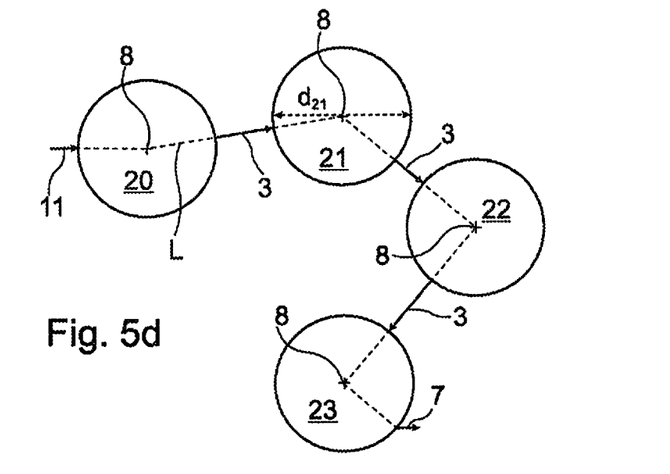

In the embodiment of panels 5c and 5d, the flotation cells 20, 21, 22, 23 are arranged in a curved manner. Such an arrangement may be advantageous, for example, due to the contours of the terrain at the site of installation. The length L is calculated by, starting from the feed inlet 11 and ending to the tailings outlet 7, drawing a line between the cell inlet 31 and the cell outlet 32 through the center of the flotation cell 20, 21, 22, 23.

In panel 5c, the flotation cells 20, 21, 22, 23 are connected by direct connections 33, whereas in panel 5d, the fluid connections 3 comprise piping. The distance D between the flotation cells varies in panel 5d. Also in the embodiments of panels 5c and 5d, it would be possible for the diameters d of the flotation cells 20, 21, 22, 23 to vary, but they are drawn to even size for simplicity.

FIG. 6, panels a to e, illustrates various exemplary vertical arrangements of a flotation line 1. Only the vertical outline of the uniplanar flotation cells 20, 21, 22, 23 is depicted. The fluid connections 3 between the flotation cells 20, 21, 22a, 22b are not detailed in FIG. 6.

The determination of a vertical uniplanarity range U is depicted in FIG. 6. An angle of +/− 1° relative to horizontal is used for drawing two lines B, B' starting from the lowest functional position of the bottom 4 of the first flotation cell 20 being larger than 150 m$^3$, equipped with a launder lip 51. The first line B is drawn as ascending B, and the second line B' as descending. The distance of the lines B, B' from each other at the vertical line traversing the lowest functional position of the bottom 4 of the last flotation cell 22b, equipped with a launder lip 51, and being larger than 40 m$^3$, gives the vertical uniplanarity range U. All flotation cells 21, 22a between the flotation cells used for determining the uniplanarity range, whose bottom 4 is within the range U are considered uniplanar, with the further condition that the launder lip height H for the flotation units 2 decreases for each subsequent flotation unit 2 in the direction of slurry flow.

The determination of the angle β is also illustrated in FIG. 6. In panels 6a, 6b, 6d and 6f, the center of the first flotation cell 20 being larger than 150 m$^3$, equipped with a launder lip 51, at the launder lip 51 height $h_{20}$, and the center of the last flotation cell 22b or 22, equipped with a launder lip 51, and being larger than 40 m$^3$ is used for drawing a line A traversing these points. The angle between A and horizontal (illustrated by launder lip height $H_{20}$ of the first flotation unit 2) determines an angle β.

Figure 6A:
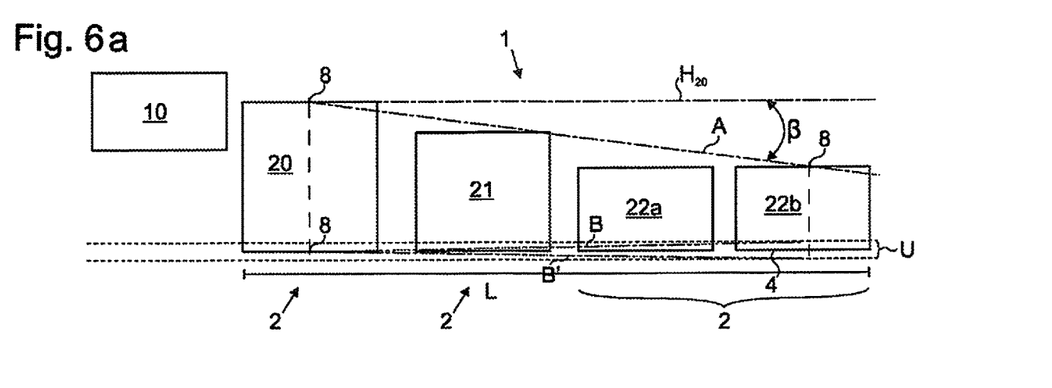
FIGS. 6a, 6b, 6c, 6d, and 6e are a schematic presentation of exemplary vertical arrangements of the flotation line according to the current disclosure.
Figure 6B:
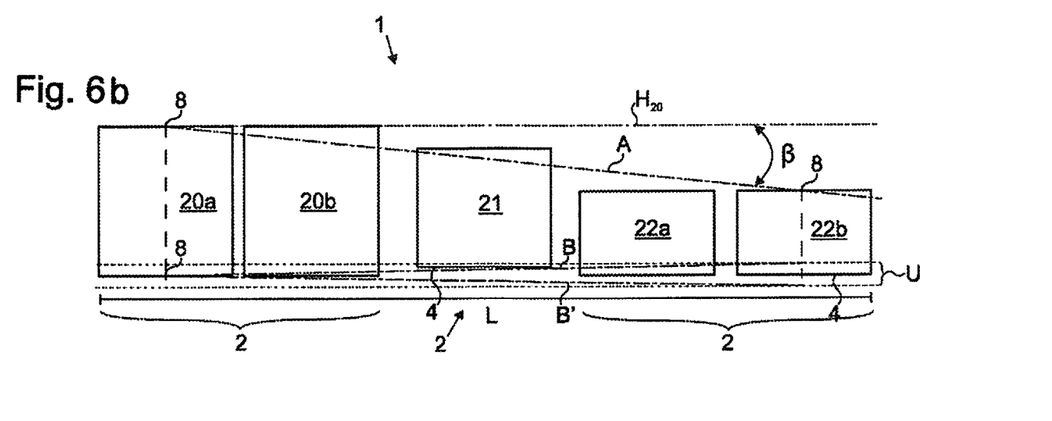
Figure 6C:
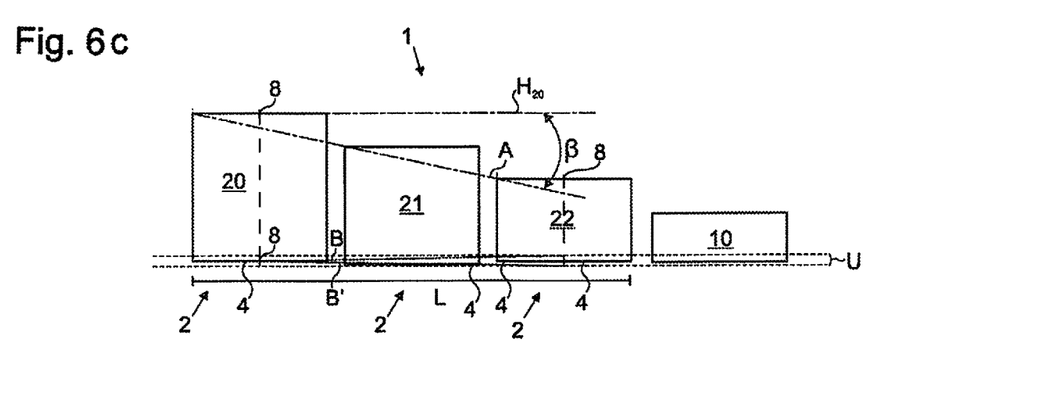
Figure 6D:
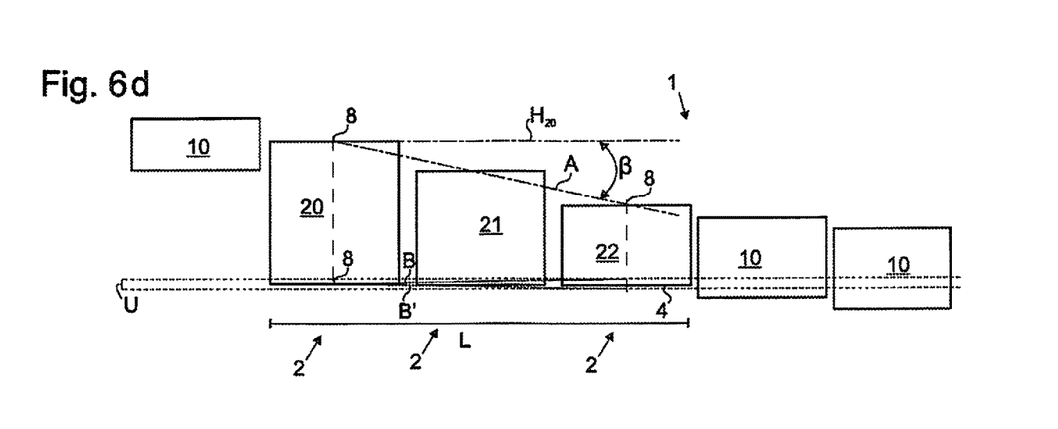
Figure 6E:
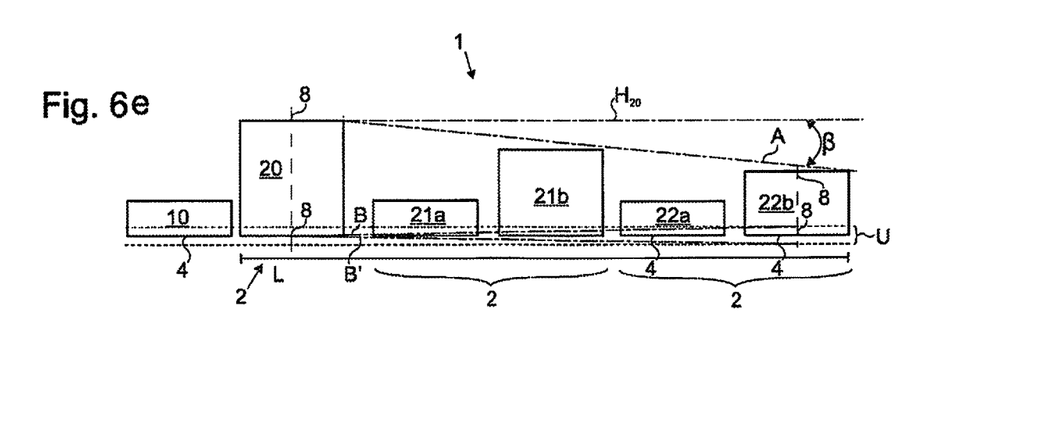

In panels 6c and 6e, other corresponding points on the circumference in the direction of the flotation line length on the launder lip level of the flotation cell are used. In panel 6c, the first point on the circumference of each flotation cell 20 and 22 in the direction of slurry flow is used. In panel 6e, the last point on the circumference of each flotation cell 20 and 22b in the direction of slurry flow is used.

In panel 6a, the flotation line 1 comprises four uniplanar flotation cells 20, 21, 22a, 22b, arranged in three flotation units 2. The first two flotation units 2 comprise one uniplanar flotation cell 20, 21 each, i.e. the flotation cell 20, 21 comprises a launder lip, a mixing apparatus and a dispersed gas feeding mechanism (not shown). The third uniplanar flotation unit 2 comprises two uniplanar flotation cells 22a, 22b. The flotation line 1 further comprises a pre-treatment device 10, which may be a conditioner tank or a flotation cell, for example. In the embodiment of panel 6a, all the flotation cells 20, 21, 22, 23 are horizontal.

In panel 6b, the flotation line 1 comprises five uniplanar flotation cells 20a, 20b, 21, 22a, 22b, arranged in three flotation units 2. The flotation cells 20a, 20b, 22a, 22b forming the first and third flotation units 2, respectively, are horizontal. However, the bottom 4 of the flotation cell 21 forming the second flotation unit 2 is higher than the in the other flotation cells 20a, 20b, 22a, 22b, but within the vertical uniplanarity range U. As the launder lip height H of the flotation units decreases, and the sizes of the flotation cells fall within the determined range, the flotation cells 20a, 20b, 21, 22a, 22b are uniplanar.

In the embodiment of panel 6c, the flotation line 1 comprises four flotation cells 20, 21, 22, 10. Of the three uniplanar flotation cells 20, 21, 22, each of which forms a flotation unit 2, the bottoms 4 of the first and third 20, 22 are horizontal. The bottom 4 of the second uniplanar flotation cell 21 is lower than that of the neighboring ones, but within the uniplanarity range U, and the launder lip 51 height of the flotation cells 20, 21, 22 decreases. Also the bottom 4 of the last flotation cell 10 in the direction of slurry flow is within range U, but its volume is less than 40 m$^3$, and it is thus not included in the uniplanar flotation line.

In the embodiment of panel 6c, there is one flotation cell 10 at the end of the flotation line 1, which is not included in the determination of the angle β. However, it would be possible that one or both ends of the flotation line 1 would have more than one additional flotation cell 10. Further, it is possible that there would be other tanks 10 for various additional flotation-related processes in these positions.

In panel 6*d*, the flotation line 1 comprises three uniplanar flotation cells 20, 21, 22 and each of them forms a uniplanar flotation unit 2. The bottoms 4 of the uniplanar flotation units 2 are at the same vertical level (i.e. horizontal). The flotation line 1 further comprises a small further tank 10, which may be a flotation cell or a tank of other type. Since it is smaller than 150 m³, it is not considered uniplanar, and not included in the calculation of the angle β. The flotation line 1 also comprises two flotation cells 10 downstream of the uniplanar flotation units 20, 21, 22. Although they are larger than 40 m³, they are not within the uniplanarity range, and thus are not considered for the calculation of the angle β.

In panel 6*e*, the flotation line 1 comprises six flotation cells 10, 20, 21*a*, 21*b*, 22*a*, 22*b*, whose bottoms 4 are all horizontal. The first flotation cell 10 has a size of less than 150 m³, and it is thus not considered a uniplanar flotation cell. The first uniplanar flotation cell 20 is the second flotation cell in the flotation line 1, and it forms a flotation unit 2. The third and fourth flotation cell 21*a*, 21*b* form one flotation unit 2, as do the fifth and sixth flotation cell 22*a*, 22*b*, respectively. The two last flotation units differ from the previous ones in that the first cell of each flotation unit 21, 22 comprises a mixing apparatus and/or a dispersed gas feeding mechanism, but no launder lip (not depicted). Thus, the flotation cell according to which the launder lip height of the flotation unit 2 is calculated is the second flotation cell 21*b*, 22*b* of each flotation unit 2.

FURTHER EXAMPLES

In an embodiment of the flotation line 1, the flotation line 1 comprises four flotation units 2, whose dimensions are given in Table 5. The first and third flotation units comprise one flotation cell 20, 22, and the second and fourth flotation units both comprise two flotation cells 21*a*, 21*b* and 23*a*, 23*b*, respectively. The flotation cells are arranged in direct fluid connection 33 with each other. Thus, the distance D between each two adjacent flotation units 2 is approximated to be 500 mm.

TABLE 5

Dimensions of a further embodiment of the flotation line 1 according to the current disclosure.

| Flotation cell | Vol., m³ | H, mm | d, mm | Drop, mm |
|---|---|---|---|---|
| 1 (20) | 630 | 7,000 | 11,000 | — |
| 2 (21a) | 200 | 5,400 | 7,200 | 1,600 |
| 2 (21b) | 200 | 5,400 | 7,200 | 0 |
| 3 (22) | 130 | 4,700 | 6,400 | 800 |
| 4 (23a) | 70 | 3,700 | 5,300 | 1,100 |
| 4 (23b) | 70 | 3,700 | 5,300 | 0 |
| Sum | | | 42,400 | 3,500 |

In the embodiment presented in table 5, the length of the uniplanar flotation line is thus the sum of all flotation cell diameters (42,400 mm) and the distances between the flotation cells (5×500 mm=2,500 mm), totaling 44,900 mm (44.9 m). As the decrease in the flotation unit launder lip height H (drop) is 3,500 mm (3.5 m), the angle β is 4.5°.

In yet another embodiment, the flotation line 1 comprises three flotation units 2, whose dimensions are given in Table 6. All of the flotation units 2 comprise two flotation cells 20*a*, 20*b*; 21*a*, 21*b*; and 22*a*, 22*b*, respectively. The flotation cells 2 are arranged in direct fluid connection 33 with each other. Thus, the distance D between all adjacent flotation cells is approximated to be 500 mm.

TABLE 6

Dimensions of a further embodiment of the flotation line 1 according to the current disclosure.

| Flotation cell | Vol., m³ | H, mm | d, mm | Drop, mm |
|---|---|---|---|---|
| 1 (20a) | 380 | 8,610 | 8,000 | — |
| 1 (20b) | 380 | 8,610 | 8,000 | 0 |
| 2 (21b) | 340 | 7,810 | 8,000 | 800 |
| 2 (21b) | 340 | 7,810 | 8,000 | 0 |
| 3 (22a) | 300 | 7,010 | 8,000 | 800 |
| 3 (22b) | 300 | 7,010 | 8,000 | 0 |
| Sum | | | 48,000 | 1,600 |

In the embodiment presented in table 6, the length of the uniplanar flotation line is thus the sum of all flotation cell 20*a*, 20*b*, 21*a*, 21*b*, 22*a*, 22*b* diameters (48,000 mm) and the distances between the flotation cells (5×500 mm=2,500 mm), totaling 50,500 mm (50.5 m). As the decrease in the flotation unit launder lip height H (drop) is 1,600 mm (1.6 m), the angle β is 1.8°.

If the flotation cells 20*a*, 20*b*, 21*a*, 21*b*, 22*a*, 22*b* are constructed such, that they are directly adjacent to each other, making distance D non-existent for practical purposes (approximated here by 20 mm), the angle β would increase to 2° (L=48,000 mm+5×20 mm=48,100 mm).

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A flotation line for treating mineral ore particles suspended in slurry, the flotation line comprising:
   at least three flotation units arranged in fluid connection with each other for allowing gravity-driven slurry flow between the at least three flotation units, each flotation unit of the at least three flotation units including at least one flotation cell, so that each flotation unit includes at least one flotation cell equipped with a launder lip, at least one flotation cell equipped with a mixing apparatus, and at least one flotation cell equipped with a dispersed gas feeding mechanism; and
   a feed inlet for supplying slurry into a first flotation unit of the at least three flotation units, wherein:
   the at least three flotation units are configured to be uniplanar, so that bottoms of the at least three flotation units are positioned at least partially within a vertical range measured from a level of a bottom of a first flotation cell equipped with a launder lip and being larger than 150 m³, wherein the vertical range is defined as a distance between a first line drawn at an angle of +1° relative to horizontal and a second line drawn at an angle of −0.1° relative to horizontal, the first and second lines starting from a lowest functional position of the bottom of the first flotation cell;
   each flotation cell equipped with a launder lip comprises a slurry inlet, a tailings outlet, and a concentrate outlet;
   a flotation unit launder lip height of each uniplanar flotation unit is lower than a flotation unit launder lip height of a preceding uniplanar flotation unit in a direction of a slurry flow, the flotation unit launder lip height determined by the launder lip of a flotation cell of a respective flotation unit, measured from a same position for each flotation unit of the flotation line, so that an angle of sloping between a horizontal line drawn through a launder lip height of a first uniplanar flotation cell and a line drawn from a point of a first uniplanar flotation cell, equipped with a launder lip and being larger than 150 m$^3$, and a corresponding point of a last uniplanar flotation cell, equipped with a launder lip and being larger than 40 m$^3$, is formed; and the angle of sloping is 1.5 to 10 degrees relative to horizontal, the angle being calculated via corresponding positions of launder lip heights of the first uniplanar flotation cell and the last uniplanar flotation cell.

2. The flotation line according to claim 1, wherein the angle of sloping is 2 to 6 degrees.

3. The flotation line according to claim 1, wherein the angle of sloping is calculated from a center of a launder lip plane of said flotation cells.

4. The flotation line according to claim 1, wherein at least 80% of a volume of uniplanar flotation cells comprising a mixing apparatus is configured to be mixed by a mechanical agitator.

5. The flotation line according to claim 1, wherein a given uniplanar flotation cell is equipped with a launder lip, a mixing apparatus, and a dispersed gas feeding mechanism.

6. The flotation line according to claim 1, wherein the tailings outlet of a uniplanar flotation cell equipped with a launder lip is connected to a slurry inlet of a subsequent uniplanar flotation cell equipped with a mixing apparatus.

7. The flotation line according to claim 1, wherein the flotation unit launder lip height of each uniplanar flotation unit is at least 400 mm lower than the flotation unit launder lip height of the preceding uniplanar flotation unit.

8. The flotation line according to claim 1, wherein flotation cells that comprise at least 80% of a uniplanar flotation cell volume have a launder lip height-to-cell diameter ratio of less than 1.2.

9. The flotation line according to claim 1, wherein flotation cells that comprise at least 80% of a uniplanar flotation cell volume have a launder lip height-to-cell diameter ratio of less than 1.0.

10. The flotation line according to claim 1, wherein flotation cells that comprise at least 80% of a uniplanar flotation cell volume have a launder lip height-to-cell diameter ratio of less than 0.4 to 0.9.

11. The flotation line according to claim 1, wherein the uniplanar flotation cells that comprise a launder lip and are larger than 150 m$^3$, have a launder lip height-to-cell diameter ratio of less than 1.2.

12. The flotation line according to claim 1, wherein the uniplanar flotation cells that comprise a launder lip and are larger than 150 m$^3$ have a launder lip height-to-cell diameter ratio of less than 1.0.

13. The flotation line according to claim 1, wherein the uniplanar flotation cells that comprise a launder lip and are larger than 150 m$^3$ have a launder lip height-to-cell diameter ratio of less than 0.4 to 0.9.

14. The flotation line according to claim 1, wherein a size of at least one uniplanar flotation cell equipped with a launder lip is at least 400 m$^3$.

15. The flotation line according to claim 1, wherein a size of the first uniplanar flotation cell, equipped with a launder lip, is at least 400 m$^3$.

16. The flotation line according to claim 1, wherein the at least one flotation cell of a second uniplanar flotation unit in the direction of the slurry flow is smaller than the at least one flotation cell of the first uniplanar flotation unit.

17. The flotation line according to claim 1, wherein the at least one flotation cell of a second uniplanar flotation unit is at least 10% smaller than the at least one flotation cell of the first uniplanar flotation unit.

18. The flotation line according to claim 1, wherein the at least one flotation cell of a third uniplanar flotation unit in the direction of the slurry flow is at least 30% smaller than the at least one flotation cell of the first uniplanar flotation unit.

19. The flotation line according to claim 1, wherein the launder lip height of the first flotation cell, equipped with a launder lip, is at least 6 m.

20. The flotation line according to claim 1, wherein a fluid connection is a direct connection between an outlet of a preceding uniplanar flotation unit and an inlet of a subsequent uniplanar flotation unit in the direction of the slurry flow.

21. The flotation line according to claim 1, wherein fluid connections between uniplanar flotation units larger than 40 m$^3$ are uniplanar.

22. The flotation line according to claim 1, wherein the at least one flotation cell in a uniplanar flotation unit is a froth flotation cell.

23. The flotation line according to claim 1, wherein the flotation line comprises three to ten uniplanar flotation units larger than 40 m$^3$.

24. The flotation line according to claim 1, wherein the flotation line comprises four to seven uniplanar flotation units larger than 40 m$^3$.

25. The flotation line according to claim 1, wherein the flotation line comprises three to ten uniplanar flotation cells larger than 40 m$^3$.

26. The flotation line according to claim 1, wherein the flotation line comprises four to seven uniplanar flotation cells larger than 40 m$^3$.

27. The flotation line according to claim 1, wherein at least 80% of the uniplanar flotation cells have a diameter of at least 3.5 m.

28. The flotation line according to claim 1, wherein at least 80% of the uniplanar flotation cells have a diameter of at least 6 m.

29. The flotation line according to claim 1, wherein at least 80% of the uniplanar flotation cells have a diameter of 3.5 to 25 m.

30. The flotation line according to claim 1, wherein at least 80% of the uniplanar flotation cells have a diameter of 6 to 20 m.

31. The flotation line according to claim 1, wherein at least 80% of a volume of third and further uniplanar flotation units is formed of flotation cells whose diameter is at least 0.4 times a diameter of an average of the uniplanar flotation cells in a second uniplanar flotation unit.

32. The flotation line according to claim 1, wherein at least 80% of a volume of third and further uniplanar flotation units is formed of flotation cells whose diameter is at least 0.8 to 1.2 times a diameter of an average of the uniplanar flotation cells in a second uniplanar flotation unit.

33. A flotation method for treating mineral ore particles suspended in slurry in a flotation line according to claim 1, the method comprising:

introducing slurry into the flotation line;

treating the slurry in the flotation cells of the flotation units for at least partial recovery of valuable metal containing particles from the slurry;

leading the slurry to pass from a preceding flotation unit to a successive flotation unit via a fluid connection; and removing tailings from the flotation line though a tailings outlet of a last flotation unit of the flotation line.

34. The flotation method according to claim 33, wherein the method further comprises arranging a conditioner upstream of the first uniplanar flotation cell, and treating the slurry in the conditioner prior to introducing into the flotation line.

35. The flotation method according to claim 33, wherein density of the slurry to be treated is 1.1 to 1.7 t/m$^3$.

36. The flotation method according to claim 33, wherein the slurry comprises mineral ore particles having a P80 of 10 to 2,000 µm.

* * * * *